June 18, 1957 H. KREIDEL ET AL 2,795,835
HOSE CLAMP
Filed July 14, 1953
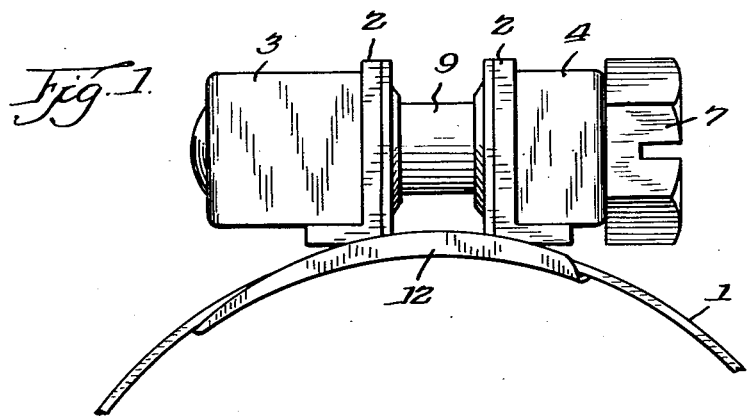
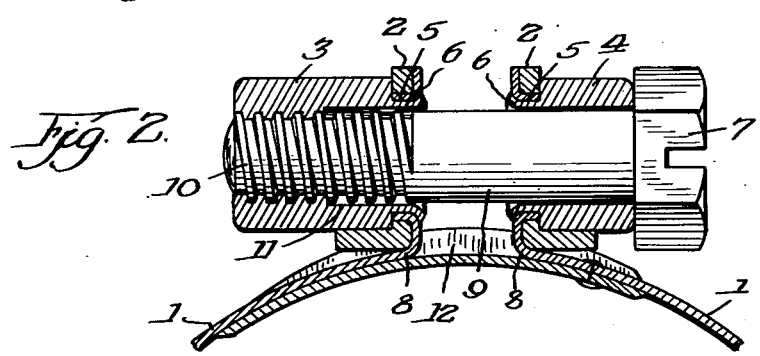
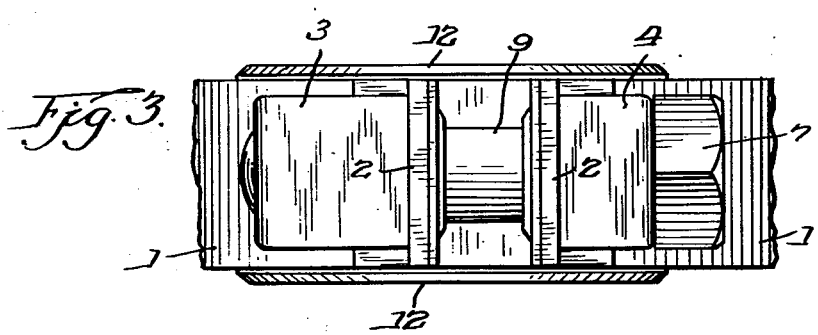
Inventors.
Hans Kreidel, &,
Hans Kreidel, Jr.
By

2,795,835
HOSE CLAMP

Hans Kreidel and Hans Kreidel, Jr., Wiesbaden, Germany

Application July 14, 1953, Serial No. 367,841

Claims priority, application Germany July 19, 1952

4 Claims. (Cl. 24—280)

This invention is concerned with a clamp device comprising a circularly shaped metallic strap provided with parallel jaws extending radially therefrom and a screw coacting with such jaws for tightening the strap about a hose, a pipe, a container, a cable or the like. The term "hose clamp" is used herein for convenience and is intended to embrace the various uses to which the device may be put.

The principal object of the invention is to provide an improved hose clamp of the above indicated type which is structurally simpler and of lighter weight than previously known clamps and which permits application of greater clamping forces while reducing the danger of shearing the clamp strap at the points of transition from its circular configuration to the clamp jaws and also avoiding deformation of and damage to the various elements which co-operate in the clamping action.

These objects and features are realized by the provision of clamp jaws each comprising a portion of the clamp strap which extends radially outwardly from its circular body and a generally L-shaped mounting member for securing a bushing which receives the associated clamp screw. Each of the two ends of the clamp strap which extends radially of the circular body thereof is provided with a potlike annular skirt forming a hole for receiving a reduced peened-over portion of the associated clamp bushing and for engagement on the outside thereof with the cross-sectionally L-shaped mounting member. The L-shaped mounting members form with the clamp bushings and with the angularly bent end portions of the clamp strap the clamping jaws extending in the manner of a vise in parallel, radially of the circular portion of the clamp strap. The short inner legs of the L-shaped mounting members have rounded edges in engagement with the corners of the radially outwardly extending ends of the clamping strap. These co-operating members of the clamp jaws, namely, the radially outwardly extending ends of the clamp strap, the L-shaped mounting members, and the clamp bushings are thus assembled with their joining ends and edges rounded to provide for favorable action of the clamping forces which are applied by the screw in threaded engagement with one of the bushings and having a head engaging the other bushing to draw the two jaws together in parallelism so as to tighten the strap about the associated hose, pipe or the like.

It must be considered in this connection that no particular problems arise in the use of clamps for clamping engagement with elastic hose elements where relatively small pressures occur in operation. The situation is different when it is necessary to provide a firm and pressure-tight clamping connection, for example, in cases where high internal pressures prevail, especially when the clamp is provided for attachment to a relatively rigid member, for example, a pipe. The clamp device according to the invention meets the severe requirements in such cases. Attention must also be paid to the clamping screw coacting with the clamp jaws. When the clamping screw is tightened, it must transmit considerable forces to the clamp strap by the action of the jaws, and the screw itself is thereby subjected to bending and other stresses of considerable magnitude. The bending stresses occur on the screw particularly at the area between the two clamp jaws where the screw shaft must counteract the jaw motion.

The invention proposes a clamp screw having a cylindrical shaft which bridges the gap between the clamp jaws. The forward end of the screw is provided with a flat thread engaging an inner thread provided only in the rearward or outer end of the clamp bushing facing away from the clamp gap. The remainder of this bushing exhibits a smooth cylindrical bore forming a guide and supporting surface for the flat outer threads of the screw shaft which are out of threaded engagement with the bushing threads.

The thread required for the tightening operation therefore does not extend across the gap of the clamp jaws. Only an exteriorly smooth screw shaft is subjected to bending stresses and such shaft portion is of relatively large diameter as compared with prior structures where the thread on the screw extended across the clamp gap. There are no weak points on the smooth screw shaft made in accordance with the invention. All angular moments that occur in old structures, so far as the clamp screw is concerned, are thus eliminated.

The provision of the thread only in the rearward or outer portion of the clamp bushing which faces away from the clamp gap reduces the thread friction occurring upon tightening of the screw. The formation of the remainder of the corresponding clamp bushing as a smooth cylindrical bore forms a guide for the flat outer surfaces of the thread on the screw which is not in threaded engagement. Both clamp bushings thus carry and guide the clamp screw throughout its entire length.

In accordance with another feature of the invention, at least one and preferably both of the bushings of the clamp jaws are secured against angular displacement incident to the tightening of the clamp screw. This feature is secured by providing the clamp bushings with flat outer surfaces which are in parallel and in alignment with flat surfaces of the associated L-shaped mounting members.

The danger of rotation of the clamp bushings coincident with the rotation of the clamp screw is thereby avoided. The outer surfaces at least of the clamp bushing carrying the thread, and preferably of both bushings, are for this purpose, formed rectangular with corresponding planes in alignment with the surfaces of the co-operating L-shaped mounting members.

The invention will now be explained with reference to the accompanying drawings wherein Fig. 1 shows a hose clamp in side view;

Fig. 2 shows the clamping jaws in sectional view; and

Fig. 3 shows the clamping jaws of Fig. 1 in elevational view.

The clamp comprises a preferably deep drawn metallic strap 1 which is placed about a desired body, hose, pipe or the like, not shown, and clamping jaws for tightening the band 1 about the corresponding body. Each jaw comprises a cross-sectionally L-shaped mounting member 2 carrying a bushing respectively indicated at 3 and 4. Each radially outwardly extending end of the strap 1 is drawn in to provide a tubular skirt 5 extending away from the jaw gap, thus forming holes for receiving the reduced ends of the associated bushing 3 or 4 which are riveted or peened over as indicated at 6, thereby securing the ends of the strap 1 to the L-shaped members 2.

The bushings 3 and 4 and the L-shaped members 2 are in this manner securely connected with the strap 1, the tubular skirts 5 being cold-drawn thus providing for added strength against cracking at places adjacent the holes formed thereby. All joining areas where the strap is secured to the remaining jaw elements are well rounded providing favorable conditions and relatively large areas for the clamping forces applied. The stresses applied upon tightening the screw 7 cannot detrimentally appear on any of the elements of the clamping device. Accordingly, no deformation can occur at the points 8 which act in the manner of fixed pivots and the danger of shearing off the strap at these places is avoided.

The clamping screw 7 has a smooth cylindrical shaft 9 extending into the interiorly threaded bushing 3 thus providing strength against bending stresses greater than that exhibited by screws carrying a thread which bridges the gap between the clamp jaws.

Instead of using a metric or a Whitworth thread with deep cut grooves which weaken the screw shaft, there is provided a flat thread 10 for threaded engagement with a corresponding interior thread cut only in the rearward or outer portion of the bushing 3, that is, only in a portion at the outer end thereof which faces away from the jaw gap. The remainder of the bushing 3 is provided with a smooth cylindrical bore 11 forming a fixed support and guide for the threads 10 of the screw which are out of threaded engagement with the interior thread in the bushing 3.

The clamping screw 7 is thus effectively supported and guided in the bores of the bushings 3 and 4 throughout its entire extent. The clamping jaws are prevented from tipping inwardly of the gap and are thus compelled to move in parallelism in the manner of the jaws of a vise.

In order to prevent rotation of the bushings and especially of the bushing 3 with the screw, responsive to great tightening force applied thereto, the bushings 3 and 4 are made to provide flat surfaces for alignment with corresponding flat upper surfaces on the short lower legs of the mounting members 2.

Numeral 12 designates an arcuate cross-sectionally generally U-shaped apron which is suitably secured to the strap 1 as shown and bridges the gap between the clamp jaws. Changes may be made within the scope and spirit of the appended claims which define what is believed to be new and desired to have protected by Letters Patent.

We claim:

1. A hose clamp comprising a metallic strap of generally circular configuration with its ends bent substantially radially outwardly, said ends extending in parallel relation, and defining a gap therebetween, a tubular skirt extending from each of said ends integral therewith and away from said gap and defining a hole, a cross-sectionally generally L-shaped mounting member for each end of said strap and having one leg thereof fitted on the outside of the corresponding tubular skirt with one side of said leg abutting the side of said end which faces away from said gap, the outer corner of each of said L-shaped members being rounded and engaging said strap at the corner from which the corresponding end extends substantially radially outwardly, a first tubular bushing having one end fitted in the hole defined by one of said skirts and secured thereto, a second tubular bushing having one end fitted in the hole defined by the other one of said skirts and secured thereto, said tubular bushings extending from the respective ends of said strap in opposite directions away from said gap, said first tubular bushing having a smooth bore formed therein, said second tubular bushing having a bore formed therein which is smooth for a portion thereof extending toward said gap and carrying a thread extending outwardly of said smooth portion to the outer end of said second bushing, and a screw for drawing the ends of said strap together to tighten said strap about a desired body, said screw comprising a head for engagement with the outer end of said first bushing having said smooth bore formed therein and having a shank comprising a smooth portion extending from said head and a thread extending from said smooth portion of said shank to the end thereof, said thread on said shank coacting with the thread in said second bushing, said smooth portion of said shank bridging said gap when said screw is tightened for drawing the ends of said strap together.

2. The structure defined in claim 1, wherein said thread in said second bushing and said thread on said shank coacting therewith are flat threads for threaded engagement with each other.

3. The structure defined in claim 1, comprising a portion on at least one of said bushings forming a flat surface for abutment with one leg of the corresponding L-shaped mounting member to hold such bushing against angular displacement incident to the tightening of said screw.

4. The structure defined in claim 1, comprising an arcuate cross-sectionally generally U-shaped apron disposed inside of said strap across the gap formed by the radially outwardly extending ends thereof.

References Cited in the file of this patent

UNITED STATES PATENTS

| 1,553,081 | Humes | Sept. 8, 1925 |
| 2,004,182 | Arey | June 11, 1935 |
| 2,370,766 | Austin | Mar. 6, 1945 |

FOREIGN PATENTS

| 681,564 | Germany | Sept. 26, 1939 |
| 558,533 | Great Britain | Jan. 10, 1944 |